United States Patent
Hadorn et al.

(10) Patent No.: US 10,834,650 B2
(45) Date of Patent: *Nov. 10, 2020

(54) DIRECTED HANDOVER OF ELEPHANT FLOWS

(71) Applicant: Opanga Networks, Inc., Seattle, WA (US)

(72) Inventors: Ben Hadorn, Seattle, WA (US); Jeffrey P. Harrang, Seattle, WA (US); John Burnette, Seattle, WA (US); David Gibbons, Seattle, WA (US)

(73) Assignee: OPANGA NETWORKS, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,495

(22) Filed: Jul. 3, 2019

(65) Prior Publication Data

US 2020/0037221 A1     Jan. 30, 2020

Related U.S. Application Data

(63) Continuation of application No. 15/703,908, filed on Sep. 13, 2017, now Pat. No. 10,383,022.

(Continued)

(51) Int. Cl.
*H04W 36/22* (2009.01)
*H04W 36/00* (2009.01)
(Continued)

(52) U.S. Cl.
CPC ....... *H04W 36/22* (2013.01); *H04W 36/0009* (2018.08); *H04W 36/04* (2013.01);
(Continued)

(58) Field of Classification Search
CPC ............ H04W 36/14; H04W 36/0083; H04W 36/0022; H04W 24/04; H04W 36/22;
(Continued)

(56) References Cited

U.S. PATENT DOCUMENTS

| 10,383,022 B2* | 8/2019 | Hadorn | H04W 28/0289 |
| 2007/0177510 A1* | 8/2007 | Natarajan | H04W 36/22 |
| | | | 370/238 |

(Continued)

FOREIGN PATENT DOCUMENTS

| KR | 10-1503718 B1 | 3/2015 |
| WO | WO2016114768 A1 | 7/2016 |
| WO | WO2016141239 A1 | 9/2016 |

OTHER PUBLICATIONS

International Search Report and Written Opinion for PCT/US2017/051412 filed on Sep. 13, 2017.

(Continued)

*Primary Examiner* — Dung Hong

(57) ABSTRACT

A method includes identifying one or more elephant flows operated by a plurality of user equipment (UE) terminals located in a first coverage area, comparing the one or more elephant flows to threshold characteristics, determining whether the coverage area is congested, causing handover of the plurality of UE terminals from the first coverage area when the one or more elephant flows exceed the threshold characteristics and the first coverage area is congested.

18 Claims, 8 Drawing Sheets

Related U.S. Application Data

(60) Provisional application No. 62/393,999, filed on Sep. 13, 2016.

(51) Int. Cl.
 *H04W 36/04* (2009.01)
 *H04W 36/28* (2009.01)
 *H04W 36/38* (2009.01)

(52) U.S. Cl.
 CPC ........ *H04W 36/28* (2013.01); *H04W 36/0027* (2013.01); *H04W 36/38* (2013.01)

(58) Field of Classification Search
 CPC .... H04W 28/08; H04L 67/148; H04L 47/125; H04L 45/22
 See application file for complete search history.

(56) References Cited

U.S. PATENT DOCUMENTS

| | | | | | |
|---|---|---|---|---|---|
| 2009/0180428 | A1* | 7/2009 | Viswanath | ............ | H04W 48/20 370/328 |
| 2013/0028093 | A1* | 1/2013 | Cho | ...................... | H04W 28/08 370/236 |
| 2013/0137416 | A1* | 5/2013 | Obuchi | ............... | H04W 52/282 455/418 |
| 2014/0064083 | A1* | 3/2014 | Ray | ................... | H04W 28/0247 370/235 |
| 2014/0233421 | A1* | 8/2014 | Matthews | ............... | H04L 49/35 370/253 |
| 2015/0163144 | A1* | 6/2015 | Koponen | ................ | H04L 47/11 370/237 |
| 2015/0281106 | A1* | 10/2015 | Lee | ..................... | H04L 47/6255 370/236 |
| 2015/0341247 | A1 | 11/2015 | Curtis et al. | | |
| 2016/0277992 | A1* | 9/2016 | Cao | ........................ | H04W 76/27 |
| 2017/0019811 | A1* | 1/2017 | Parulkar | ............. | H04L 41/0654 |
| 2017/0034750 | A1* | 2/2017 | Tamura | ................. | H04W 48/10 |
| 2017/0367022 | A1* | 12/2017 | Chandrasekaran | ... | H04W 36/22 |
| 2019/0059021 | A1* | 2/2019 | Corroy | .................. | H04W 28/08 |

OTHER PUBLICATIONS

Search Report dated Apr. 9, 2020 for European Application No. 17851478.2.

* cited by examiner

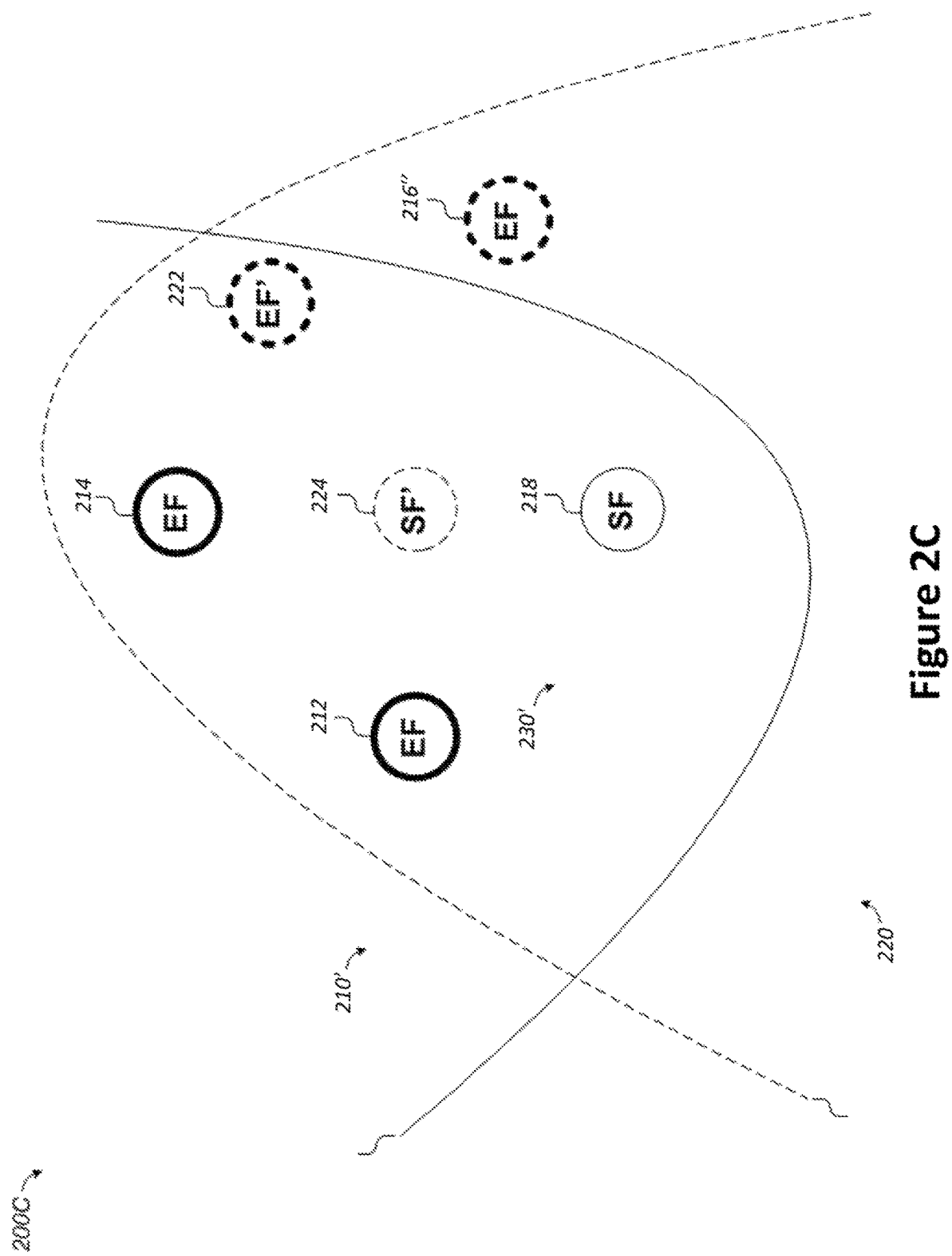

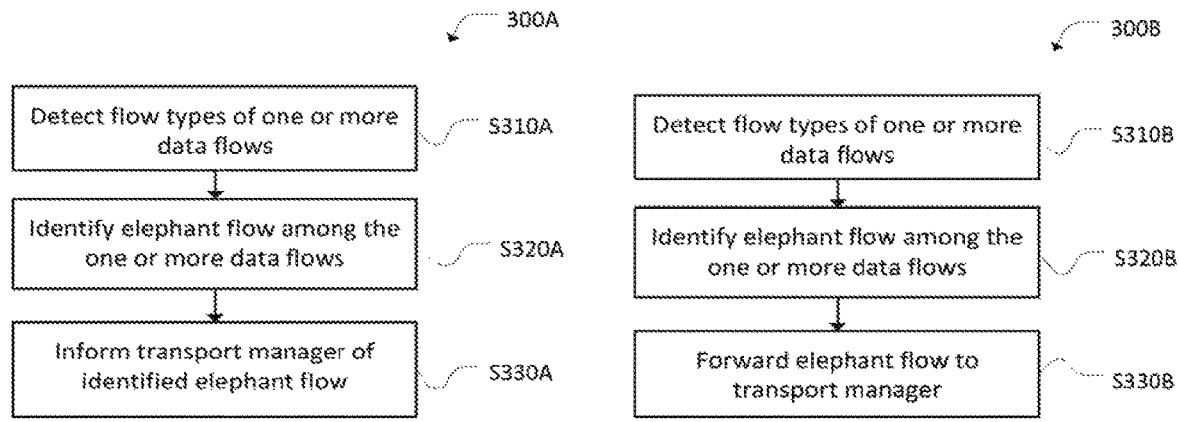
Figure 3A
Figure 3B
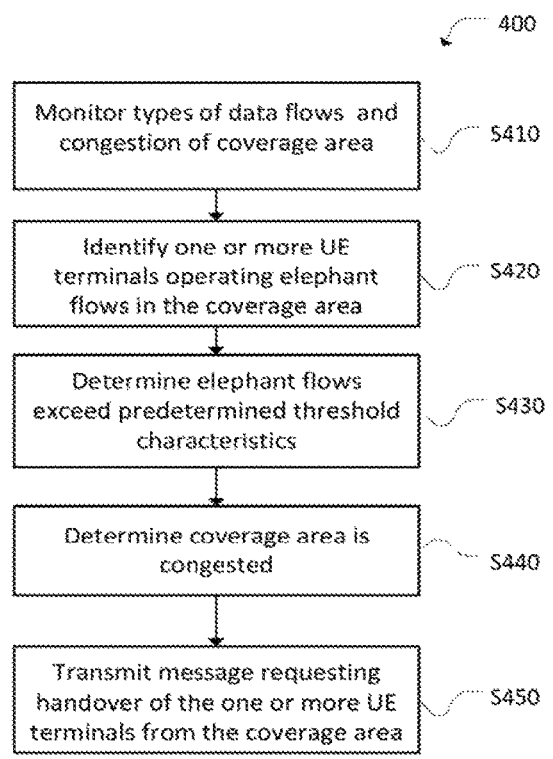
Figure 4

DIRECTED HANDOVER OF ELEPHANT FLOWS

CROSS REFERENCE TO RELATED APPLICATIONS

This application is a continuation of and claims priority to U.S. patent application Ser. No. 15/703,908, filed on Sep. 13, 2017, which claims the benefit of U.S. Provisional Patent Application No. 62/393,999, filed on Sep. 13, 2016, which is incorporated by reference herein for all purposes.

BACKGROUND

Mobile cellular networks are typically engineered by operators to provide diverse sets of voice and data services to groups of users sharing network resources. In a standard configuration, each of the networked radio coverage cells (also known as "sectors") are arranged to provide static contiguous wireless coverage within a regional service area. Users of a mobile cellular network connect to the network via user equipment terminals (UEs), which attach wirelessly to one or more of the cells.

The network and the UEs support handover services, which provide continuous and uninterrupted user-perceived communication as users move between coverage cells. For example, the network may handover a UE from a first cell to a second cell when the UE moves from the first cell into the second cell.

Because of a random distribution of users and a varying demand for voice and data services, traffic loads vary from cell to cell. Adjoining or overlapping cells may have dramatically different loads over time.

When a cell experiences more demand for resources than it can satisfy, the cell is "congested." When the cell is congested, overloaded shared resources within the cell may be allocated on a fair basis among the UEs attached to the cell. However, each UE is allocated fewer resources when the cell is congested than when the cell is not congested. Those reduced allocations during congestion may be insufficient for certain high data throughput services, such as video services or timely large file delivery services, e.g., downloading email attachments. Congestion is therefore a condition to be avoided whenever possible.

Accordingly, mobile networks, when possible, "load balance" cells by handing over UEs between serving cells. Load balancing prevents scenarios, for example, where one cell is operating in congestion, and another neighboring or overlapping cell is idle. Load balancing tends to maximize the usage of the aggregate capacity of the cellular network, improve the economic use of deployed infrastructure, and improve quality of experience for users of the mobile network.

For example, operators may trigger load balancing between cells whenever a numerical threshold difference exists in the aggregate traffic loads between adjoining or overlapping coverage cells that have one or more operating UEs in a common coverage area. For example, by forcing or biasing handover of UEs from a higher traffic load cell to a lower traffic load cell, the aggregate traffic load levels between the two cells are driven towards equilibrium, and general congestion may be lessened.

Existing methods, however, currently lack novel methods of triggering and executing load balancing to more efficiently and equally reduce overall network congestion that may be aligned with Self-Organizing-Network (SON) principles.

BRIEF SUMMARY OF THE DISCLOSURE

According to various embodiments of the present disclosure, a method includes identifying one or more elephant flows operated by a plurality of user equipment (UE) terminals located in a first coverage area; comparing the one or more elephant flows to threshold characteristics; determining whether the coverage area is congested; and causing handover of the plurality of UE terminals from the first coverage area when the one or more elephant flows exceed the threshold characteristics and the first coverage area is congested.

In an embodiment, identifying the one or more elephant flows generated by the plurality of UE terminals operating in the first coverage area includes being forwarded the one or more elephant flows by a flow detector.

In an embodiment, comparing the one or more elephant flows to the threshold characteristics includes determining whether a number of the one or more elephant flows exceeds a threshold number, and the one or more elephant flows exceeds the threshold characteristics when the number of the one or more elephant flows is greater than the threshold number.

In an embodiment, comparing the one or more elephant flows to the threshold characteristics includes determining whether an elephant flow imbalance exists between the first coverage area and a second coverage area, the first and second coverage areas being overlapped.

In an embodiment, determining whether the coverage area is congested includes determining whether a surplus capacity of the coverage area is under a threshold capacity, the surplus capacity being defined between a total capacity of the coverage area and an amount of the total capacity currently in use.

In an embodiment, causing handover of one or more of the plurality of UE terminals from the first coverage area when the one or more elephant flows exceed the threshold characteristics and the first coverage area is congested includes transmitting a message to network equipment, the message requesting handover of the one or more UE terminals.

In an embodiment, the message identifies a selected UE terminal among the one or more UE terminals, the selected UE terminal being located in an area where the first coverage area overlaps a second coverage area.

In an embodiment, the method further includes determining that there is an elephant flow imbalance between the first coverage area and the second coverage area, wherein the second coverage area is associated with fewer elephant flows than the first coverage area.

In an embodiment, the network equipment is a base station serving the first coverage area.

In an embodiment, causing handover of the one or more of the plurality of UE terminals from the first coverage area when the one or more elephant flows exceed the threshold characteristics and the first coverage area is congested includes causing handover of a selected one of the UE terminals from the first coverage area to a second coverage area, the second coverage area overlapping the first coverage area.

In an embodiment, causing handover of at least one of the one or more UE terminals from the first coverage area when the one or more elephant flows exceed the threshold characteristics and the first coverage area is congested includes causing handover of a selected one of the one or more UE terminals from a first network technology to a second network technology.

According to various embodiments of the present disclosure, a system includes a memory storing non-transitory program commands; and a processor, wherein, when the processor executes the program commands, the processor: identifies one or more elephant flows generated by a plurality of user equipment (UE) terminals operating in a first coverage area; compares the one or more elephant flows to threshold characteristics; determines whether the first coverage area is congested; and causes handover of one or more of the plurality of UE terminals from the first coverage area when the one or more elephant flows exceed the threshold characteristics and the first coverage area is congested.

According to an embodiment, the processor compares the one or more elephant flows to the threshold characteristics by determining whether a number of the one or more elephant flows exceeds a threshold number, and the one or more elephant flows exceed the threshold characteristics when the number of the one or more elephant flows is greater than the threshold number.

According to an embodiment, the processor compares the one or more elephant flows to threshold characteristics by determining whether an elephant flow imbalance exists between the first coverage area and a second coverage area, the first and second coverage areas being overlapped.

According to an embodiment, the processor determines whether the coverage area is congested by determining whether a surplus capacity of the coverage area is under a threshold capacity, the surplus capacity being defined between a total capacity of the coverage area and an amount of the total capacity currently in use.

According to an embodiment, the processor causes handover of one or more of the plurality of UE terminals from the first coverage area when the one or more elephant flows exceed the threshold characteristics and the first coverage area is congested by transmitting a message to network equipment, the message requesting handover of the one or more UE terminals, wherein the message identifies a selected UE terminal among the one or more UE terminals, the selected UE terminal being located in an area where the first coverage area overlaps a second coverage area.

According to an embodiment, the processor causes handover of one or more of the plurality of UE terminals from the first coverage area when the one or more elephant flows exceed the threshold characteristics and the first coverage area is congested by causing handover of a selected one of the one or more UE terminals from the first coverage area to a second coverage area, the second coverage area overlapping the first coverage area.

According to an embodiment, a transport manager includes a memory storing non-transitory program commands; and one or more processors, wherein, when the one or more processors execute the program commands, the one or more processors: identify first elephant flows operated by a plurality of first UE terminals in a first coverage area; determine a number of the first elephant flows exceeds a number of second elephant flows operated by second UE terminals in a second coverage area, the second coverage area overlapping the first coverage area; determine the first coverage area is congested; determine the second coverage area is uncongested; and transmit a message to a base station serving the first coverage area, the message requesting handover of at least one first UE terminal from the first coverage area to the second coverage area.

BRIEF DESCRIPTION OF THE DRAWINGS

FIG. 2C illustrates a plurality of UE terminals in overlapping cell coverage areas after a shift in coverage according to an embodiment.

FIGS. 3A and 3B are a flow charts illustrating methods of identifying an elephant flow according to embodiments.

FIG. 4 is a flow chart illustrating a method of requesting handover of a UE terminal operating an elephant flow according to an embodiment.

DETAILED DESCRIPTION

Figure 1A:
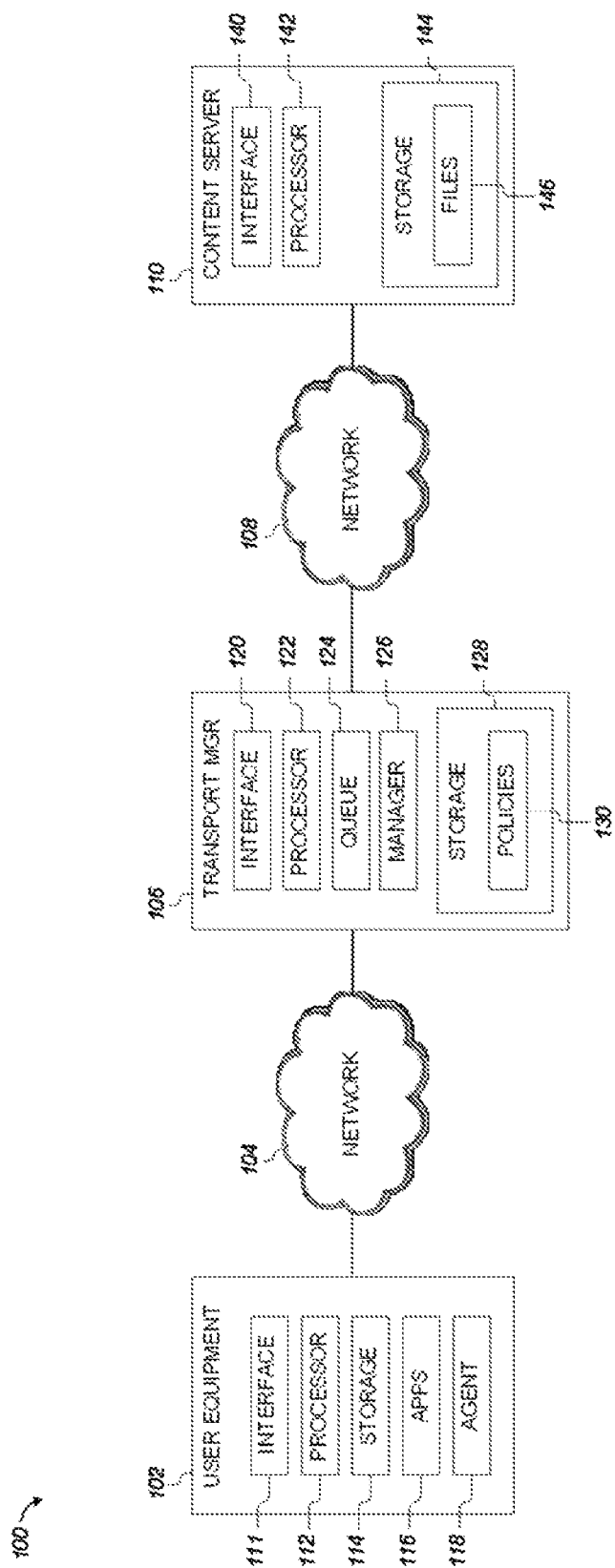
FIGS. 1A and 1B illustrate system architectures according to embodiments of the present disclosure.

Embodiments of the present disclosure relate to load balancing between different coverage areas of a network based on types of data flows operating in the coverage areas.

For example, when a coverage area is determined to be congested, network resources may be fairly distributed to terminals operating data flows in the coverage areas. The coverage area is determined to be congested, for example, when it has limited surplus capacity.

Some data flows in the coverage area may be significantly more burdensome to the network than other data flows in the coverage area. For example, data flows identified as "elephant flows" demand significantly more network resources than other data flows in the coverage area. The elephant flows operating in the coverage area tie up a significant amount of the network resources, thereby making fair allocation of surplus network capacity to UE terminals operating in the coverage area relatively difficult when the coverage area is congested.

According to various embodiments of the present disclosure, the UE terminals associated with the elephant flows are identified based on traffic flow characteristics, and selectively handed over from the congested coverage area. The UE terminals are handed over, for example, to a less congested, less burdened, overlapping coverage area in the same network, or in another network.

Due to the selective handover, the elephant flows can be allocated more evenly among geographically overlapping coverage areas. As a result of the even allocation of elephant flows, according to various embodiments, network resources can be fairly allocated in otherwise congested coverage areas.

Embodiments of the present disclosure provide systems and methods for load balancing aggregate traffic loads between cells of a mobile network by utilizing traffic flow characteristics and surplus capacity availability.

Traffic flow characteristics, as understood in some embodiments, include the relative data throughput value and duration of a user traffic flow.

According to embodiments, a traffic flow is a unidirectional collection of data packets traversing a packet network that share a common set of transport layer identifiers or equivalent. The data packets traverse between two nodes, e.g., a UE terminal and a content server. A flow is unidirectional (e.g., uplink or downlink) but may be paired with a flow in the opposite direction (e.g., packets with interchanged destination and source network addresses, interchanged port addresses, common flow label, etc.) between the same pair of connection endpoints.

An elephant flow is a traffic flow that has a relatively higher data throughput and a relatively longer duration than other data flows traversing the network. For example, an elephant flow has a higher data throughput than a threshold data throughput, and/or a longer duration than a threshold duration. According to an embodiment, the threshold data throughput and the threshold duration change over time, and change depending on the capabilities of the network.

A standard flow is a traffic flow that has relatively low or standard data throughput and/or duration compared to other data flows traversing the network. For example, a standard flow has a lower data throughput than the threshold data throughput and/or a longer duration than the threshold duration.

Each elephant flow or standard flow is associated with a UE terminal that shares network resources. That is, each elephant flow or standard flow includes a plurality of packets transmitted to or from the associated UE terminal. A UE terminal associated with an elephant flow or a standard flow is attached to a cell within the network, for example.

According to various embodiments, a UE terminal is a cell phone, a computer, a laptop computer, a tablet, a handheld device, a handset device, a smart television, a smart watch, or a combination thereof. In certain embodiments, a UE terminal is a device capable of wirelessly connecting with a network.

Surplus capacity (a.k.a., "idle capacity") is, in some embodiments, shared network capacity (e.g., network bandwidth, network resources, etc.) that is used for transferring portions or all of the data over the network, but is otherwise unused. For example, if a total network traffic carrying capacity of a cell or network is X, and the current aggregate network traffic load of the cell or network is Y, then the surplus capacity of the cell or network is X-Y, where Y less than or equal to X. In some scenarios, the surplus capacity of a shared multi-user data network is transient and fluctuates randomly over time. Use of surplus capacity, as defined in the present disclosure, is distinct from a fair-share or similar competitive shared use of network capacity (e.g. when the aggregate traffic load exceeds the network capacity limit X then each of N users sharing the network receives a X/N share of the network capacity), N being nonzero.

FIG. 1A illustrates a system architecture 100 according to an embodiment.

The system architecture 100 includes at least one UE terminal 102, at least one transport manager 106, and at least one content server 110. Although FIG. 1A illustrates a single UE terminal 102, a single transport manager 106, and a single content server 110, in an embodiment, the system architecture 100 includes a plurality of UE terminals 102, a plurality of transport managers 106, and/or a plurality of content servers 110.

The UE terminal 102 includes an interface 111, a processor 112, a storage 114, one or more apps 116, and an agent 118.

The transport manager 106 includes an interface 120, a processor 122, a queue 124, a manager 126, and a storage 128. The storage 128 stores one or more policies 130.

The content server 110 includes an interface 140, a processor 142, and a storage 114. The storage 114 stores one or more files 146.

A data flow exists between the UE terminal 102 and the content server 110. The data flow includes a plurality of packets, traversing packet networks 104 and 104, between the UE terminal and the content server 110. That is, the UE terminal 102 and the content server 110 are end nodes of the data flow.

For example, the UE terminal 102 transmits a request packet for one of the files 146 stored at the content server 110 via packet networks 104 and 108, the content server 110 transmits the requested files 146 to the content server 110 via the packet networks 104 and 108, or both. The packets in the data flow also pass through the transport manager 106, which is connected between the UE terminal 102 and the content server 110.

The packet data networks 104 and 108 interconnect the UE terminal 102, the transport manager 106, and the content server 110. According to various embodiments, the packet data networks 104 and 108 are two distinct networks or part of a single, large, functional network.

In some embodiments, one of the packet data networks 104 and 108 is an access network (AN) 104, which connects the transport manager 106 and the UE terminal 102. The AN 104 is, for example, is a mobile cellular access network (e.g., 2G, 3G, LTE, 5G) or another type of network capable of connecting the UE terminal 102 and the transport manager 106. In a specific embodiment, the AN 104 includes a core collection of sub-nodes linking to a radio access network (RAN).

In some embodiments, the other one of the packet data networks 104 and 108 is a wireless access network (WAN) 108, which connects the content server 110 and the transport manager 106. The WAN 108 is, for example, the Internet or another type of network capable of connecting the content server 110 and the transport manager.

According to an embodiment of the present disclosure, at least a selected portion of the user packet data traffic between the UE terminal 102 and the content server 110 passes through, or is in-line, with the transport manager 106. That is, at least a portion of the packets in the data flow between the UE terminal 102 and the content server 110 pass through the transport manager 106. In some embodiments, at least a selected portion or copy of AN control packet data is directed towards, or passes through, the transport manager 106. In a specific example, user packet data traffic between a plurality of UE terminals 102 and a plurality of content servers 110 passes through a single transport manager 106.

The transport manager 106 is located between the UE terminal 102 and the content server 110. In an embodiment, the transport manager 106 is at a border traffic aggregation point connecting the AN 104 with the WAN 108. For example, in a 3rd Generation Partnership Project (3GPP) standard mobile network, the aggregate point is part of the sGi-LAN connecting to the Packet Data Network (PDN)-Gateway core element and outwards to the Internet. Alternately, the aggregate point is part of a Gi-LAN connecting to a gateway GPRS support node (GGSN)-Gateway and outwards to the Internet. However, in other embodiments, the transport manager 106 is located elsewhere.

In some embodiments, the transport manager 106 is located within, and is part of, a content delivery network serving one or more ANs including the AN 104. According to various embodiments, the transport manager 106 is located at a network node or endpoint between (or including) the UE terminal 102 and the content server 110.

In embodiments, the transport manager 106 is located at a base station, a base station controller, a gateway, or an access point serving one or more UE nodes including the UE terminal 102. For example, the transport manager 106 is located between the base station or base station controller and its serving gateway. In an embodiment, the transport manager 106 is located between a serving GPRS support node (SGSN) and a serving gateway/mobile management entity (SGW/MME).

Figure 1B:
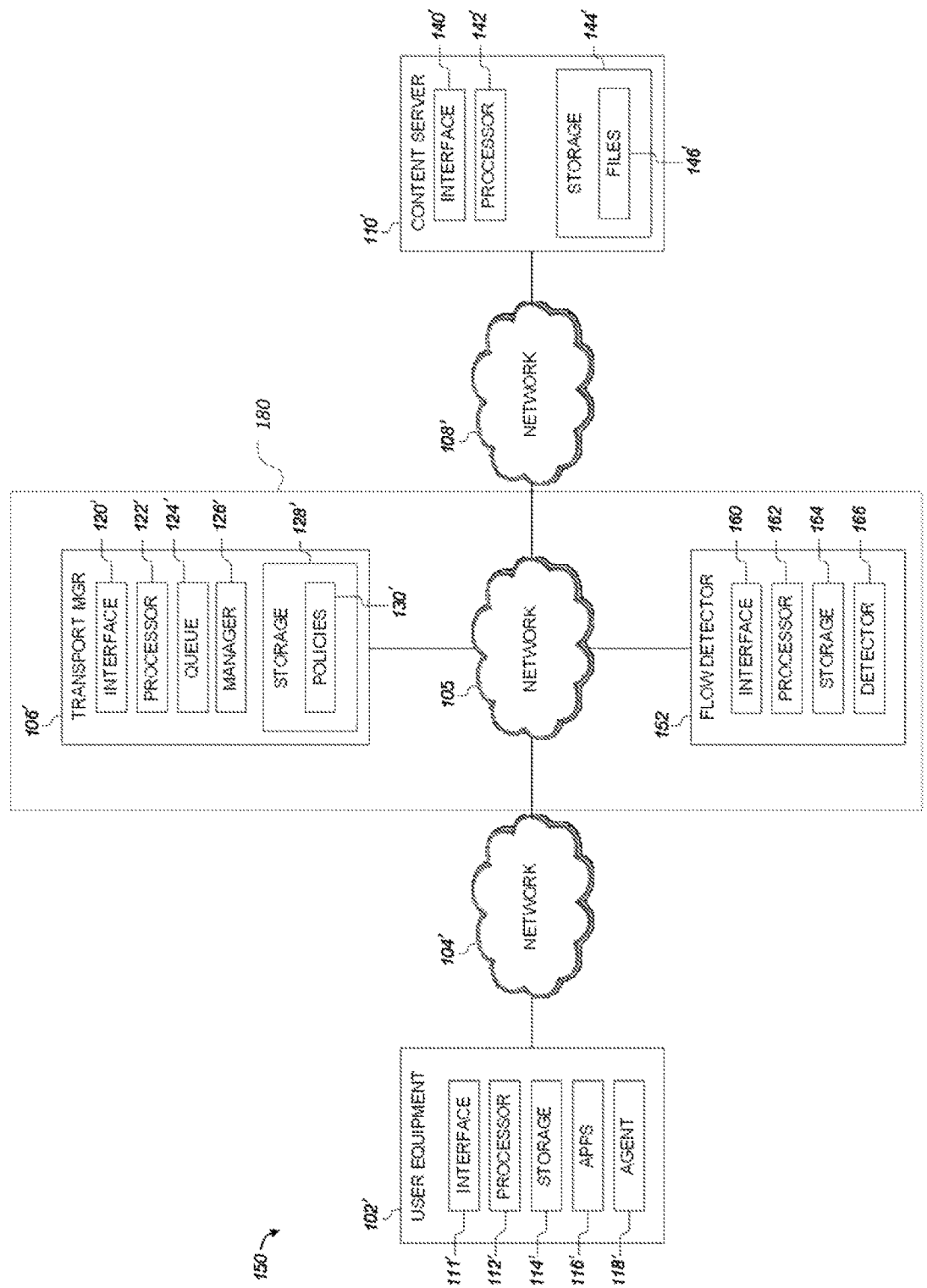

FIG. 1B illustrates a system architecture 150 according to an embodiment.

The system architecture 150 includes at least one UE terminal 102', at least one transport manager 106', at least one flow detector 152, and at least one content server 110'. Although a single UE terminal 102', a single transport manager 106', a single flow detector 152, and a single content server 110' are illustrated in FIG. 1B, in an embodiment, the system architecture 150 includes a plurality of UE terminals 102', a plurality of transport managers 106', a plurality of flow detectors 152', and a plurality of content servers 110'.

The UE terminal 102' includes an interface 111', a processor 112', a storage 114', one or more apps 116', and an agent 118'.

The transport manager 106' includes an interface 120', a processor 122', a queue 124', a manager 126', and a storage 128'. The storage 128' stores one or more policies 130'.

The flow detector 152 includes an interface 160, a processor 162, a storage 164, and a detector 166.

The content server 110' includes an interface 140', a processor 142', and a storage 114'. The storage 114' stores one or more files 146'.

A data flow including a plurality of packets exists between the UE terminal 102' and the content server 110'. The UE terminal 102' and the content server 110' are end nodes of the data flow. For example, the UE terminal 102' transmits a request for one of the files 146' stored at the content server 110' via packet networks 104', 105, and 108', the content server 110' transmits the requested files 146' to the content server 110' via the packet networks 104', 105, 108', or both.

The packet data networks 104', 105, and 108' interconnect the UE terminal 102', the transport manager 106', the flow detector 152, and the content server 110'. Any of the packet data networks 104', 105, and 108' are distinct networks, part of a single large functional network, or both. In some embodiments, the network 105 is a local area network (LAN) or data center, for example, an sGi or Gi-LAN, located at the border of a mobile network.

In certain embodiments, the transport manager 106', the flow detector 152, and the network 105 are part of an integrated system 170. In some embodiments, the system 170 includes the transport manager 106' and the flow detector 152 incorporated into an integrated hardware component, with or without the network 105.

Unlike the system architecture 100 illustrated in FIG. 1A, the system architecture 150 illustrated in FIG. 1B includes the separate flow detector 152 element. In other embodiments, the flow detector 152 is integrated into a system that also includes the transport manager 106'.

In an embodiment, the flow detector 152 monitors and/or samples data traffic traversing packet networks 104', 105, and 108'. The flow detector 152 selects data flows in the data traffic for further processing based on configured policies or templates characterizing the data flows. In an embodiment, the policies or templates are stored in the storage 164.

For example, the flow detector 152 uses the detector 164, which is functional sub-element of the flow detector 152, to measure the average throughput, delivered data volume, duration, and other characteristics of a data flow in order to classify the data flow as relatively burdensome in its use of network resources. The flow detector 152 classifies the data flow using the configured policies or templates. For example, the flow detector 152 determines which data flows in the system architecture 150 are elephant flows.

In some embodiments, the flow detector 152 determines which packets belong to elephant flows based on headers of the packets. For example, the flow detector 152 inspects network and transport layer headers of the packets including, for example, combinations of internet protocol (IP) source and destination addresses, transmission control protocol (TCP) or user datagram protocol (UDP) source and destination ports, protocols (in the case of IPv4), flow labels (in the case of IPv6), flags, extension header fields, etc.

In some scenarios, even when the network or transport layer packet data payloads are encrypted or obfuscated, the payload headers of the packets may be used by the flow detector 152 for identifying packets belonging to a specific data flow. In other scenarios where the packet data payloads are readable, the information in the network or transport packet payloads may be used by the flow detector 152 to further identify and/or distinguish packets associated with a particular data flow.

In some embodiments, the flow detector 152 causes elephant flows to selectively be diverted through the transport manager 106'. For example, once the flow detector 152 has identified an elephant flow, the flow detector 152 triggers reconfiguration of the packet forwarding logic in the network 105, so that the packets within the elephant flow traversing that network 105 are directed to the transport manager 106'. That is, the transport manager 106' becomes within the end-to-end path between server 110' and user equipment 102' endpoints. For example, the flow detector 152 communicates an identified elephant flow's characteristics to equipment of the network 105, e.g., one or more routers and switches, so that the network 105 can dynamically configure forwarding or switching rules in order to cause subsequent packets in the identified elephant flow to pass through the transport manager 106' using principles of software defined networking.

In other embodiments, the transport manager 106' is included in the end-to-end path by default rules or cabling, and the flow detector 152 informs the transport manager 106' of detected flows that match one or more classification templates. Accordingly, the transport manager 106 may forward packets of standard traffic flows without further processing.

In some embodiments, when the flow detector 152 detects a bidirectional elephant flow, both directions of the bidirectional flow are directed to the transport manager 106'.

In an embodiment, the flow detector 152 and the transport manager 106' are part of the network 105. In some embodiments the network 105 may be a local area network or data center for example a SGi or Gi-LAN located at the border of a mobile network. However, in other embodiments, the flow detector 152 and the transport manager 106 are located outside of the network 106. In some alternate embodiments, the flow detector 152 and transport manager 106' are within a content delivery network serving one or more ANs including the AN 102. In other alternate embodiments, the flow detector 152 and the transport manager 106' are located at any node or endpoint between (or including) the UE terminal 102' and the content server 110', i.e., the end nodes. For instance, the flow detector 152 and the transport manager 106' are located at a base station or base station controller or gateway or access point serving one or more UE nodes including the UE terminal 102'. The flow detector 152 and the transport manager 106', in another embodiment, are located between a base station or base station controller and its serving gateway (e.g., SGSN, SGW/MME).

In some embodiments, the transport manager 106 or 106' detects, measures, and modulates data between flow connection endpoints, such as the content server 110 or 110' and the UE terminal 102 or 102'.

Further, the transport manager 106 or 106' determines whether data flows are active in congested cells. For example, a congested cell is defined as a cell with little or no remaining surplus capacity. Some of these aspects are further described in "SYSTEMS AND METHODS FOR PACING DATA FLOWS" (US 2016-0261510 A1) and the references therein.

According to various embodiments, a cell is a coverage area. In an embodiment, the transport manager 106 or 106' determines that a cell is congested when the surplus capacity of the cell is at or below a threshold capacity.

In some embodiments, the transport manager 106 or 106' causes one or multiple control elements within the AN 104 or 104' to execute handover decisions by exchanging information with the control elements, based on the availability of surplus capacity in the cell and the types of traffic flows associated with one or more user equipment terminals in the cell. In specific embodiments, when the transport manager 106 or 106' determines that a cell has limited surplus capacity and has one or more elephant flows associated with one or more UEs, the transport manager 106 or 106' causes handover of at least one of the UEs from the cell.

Figure 2A:
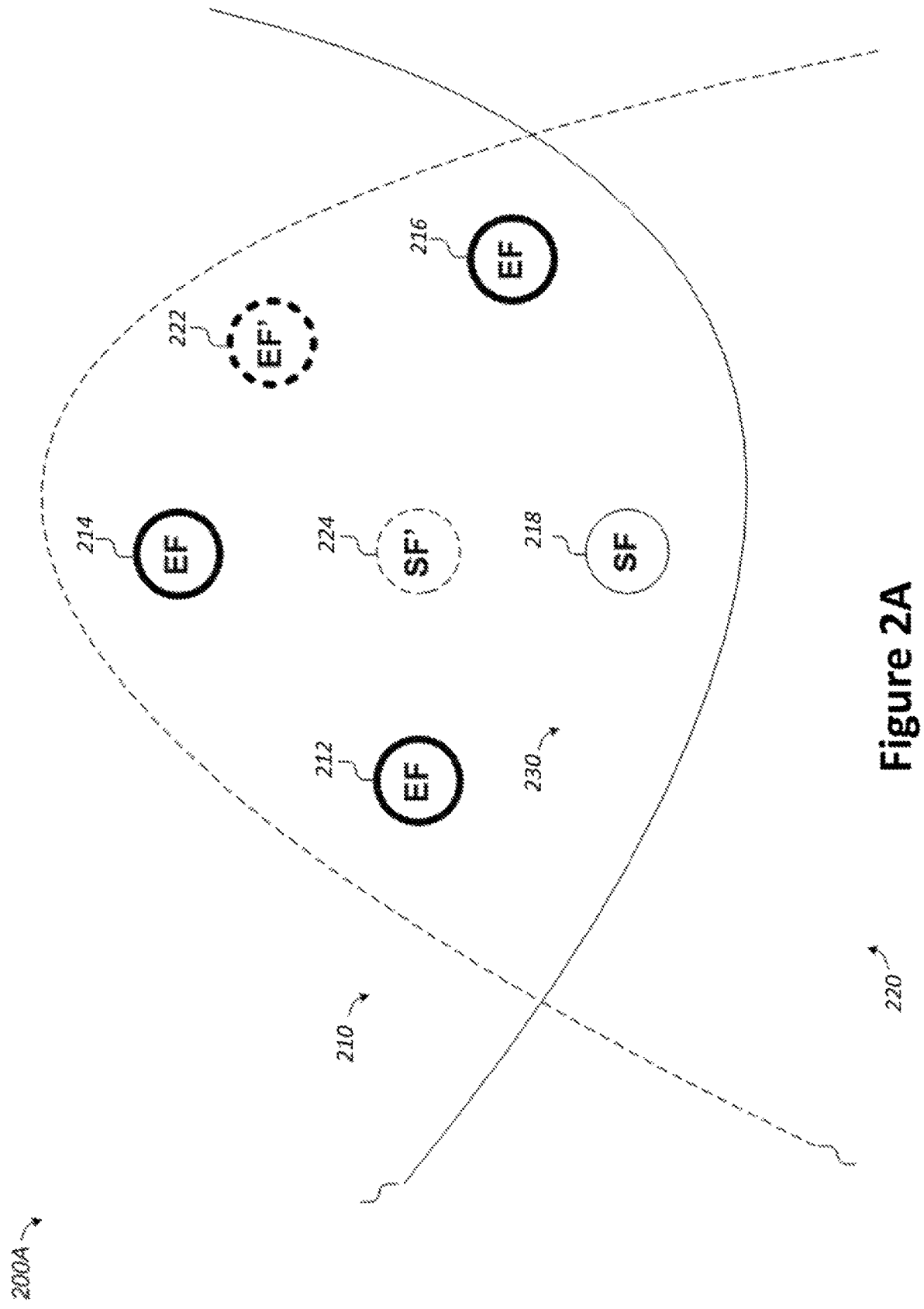
FIG. 2A illustrates a plurality of UE terminals in overlapping cell coverage areas before a UE terminal handover according to an embodiment.

FIG. 2A illustrates a plurality of UE terminals in overlapping cell coverage areas before a UE terminal handover according to an embodiment.

As shown in FIG. 2A, a plurality of UE terminals 212-218, 222, and 224 are attached to a radio access network (RAN) that includes first and second coverage areas 210 and 220. The first and second coverage areas 210 and 220 are, for example, cellular coverage areas. The first and second coverage areas 210 and 220 overlap in an overlapping area 230.

First UE terminals 212-218 are attached wirelessly to a first serving cell (e.g., a first base station) with the first coverage area 210. Second UE terminals 222 and 224 are attached wirelessly to a second serving cell (e.g., a second base station) with the second coverage area 220. The first UE terminals 212-218 and the second UE terminals 222 and 224 are located in the overlapping area 230. Although not illustrated in FIG. 1A, additional UE terminals may be attached to the first serving cell or the second serving cell outside of the overlapping area 230.

Some of the first UE terminals 212-218 and the second UE terminals 222 and 224 are associated with users and devices that are actively engaged with network communications and traffic flows that are characterized as elephant flows. Some of the first UE terminals 212-218 and the second UE terminals 222 and 224 are associated with users and devices that are actively engaged with network communications and traffic flows that are characterized as non-elephant flows (a.k.a., standard flows). As illustrated in FIG. 2A, the first UE terminals 212-218 attached to the first serving cell include a plurality of first elephant flow UE terminals 212-217 and a first standard flow UE terminal 218, and the second UE terminals 222 and 224 attached to the second serving cell include a second elephant flow UE 222 and a second standard flow UE terminal 222.

A system, e.g., a transport manager and/or a flow detector (transport manager 106 or 106', and/or flow detector 152), detects an active flow type of each the various active UE terminals in the first and second coverage areas 210 and 220. That is, the system detects whether each active UE terminal being monitored is associated with an elephant flow or a standard flow. For instance, the system determines the second elephant flow UE terminal 222 is associated with an elephant flow by determining that the second elephant flow UE terminals 222 is operating a video streaming app, and further determines the second standard flow UE terminal 206 is associated with a standard flow by determining that the second standard flow UE terminal 206 is operating a social network chat app.

The system is further able to detect whether each of the first and second coverage areas 210 and 220 is currently experiencing congestion. For example, the system determines whether each of the first and second coverage areas 210 and 220 are congested by determining whether a surplus capacity of each of the first and second serving cells is lower than a threshold capacity.

In order to determine which flows are being served by a particular cell/base station, in some embodiments, the system utilizes control information obtained from the AN (e.g., 104 or 104') associated with the user packet data traffic. For example, in a 3GPP network, the system uses the Tunnel Endpoint Identifiers (TEID) in the Generic Tunneling Protocol (GTP) to inspect specific user traffic, as well as to control messages linking the current serving cell with the endpoint IP addresses of packets in the specific user traffic, and thereby with a flow's packet header identifiers.

Accordingly, in embodiments, the system generates and stores information identifying the absolute numbers of UE terminals operating in each cell, the relative fraction of UE terminals operating elephant flows in each cell, and the relative fraction of UE terminals operating standard flows in each cell, the availability of surplus capacity in each cell, or a combination thereof. In an embodiment, the information includes a total number of UE terminals operating elephant flows in each cell. The information, in some embodiments, is used by the business logic of the system to trigger decisions affecting which UE terminals should be handed over to neighbor cells, in order to achieve an optimal traffic load balancing and a desired quality of experience for users of the network.

The system, in some embodiments, communicates control messages with the AN's RAN handover control elements (e.g., a base station, a base station controller, any network equipment capable of controlling handover of UE terminals in the network, etc.), in order to cause the AN to preferentially execute handover of UE terminals actively operating elephant flows in first cells (as opposed to standard flows) to other cells and/or networks.

For example, as illustrated by FIG. 2A, there are relatively fewer UE terminals operating elephant flows in coverage area 220 than in coverage area 210, i.e., there are three first elephant flow UE terminals 212-216, but only one second elephant flow UE terminal 222. In other words, there is an elephant flow imbalance between coverage area 210 and coverage area 220.

Furthermore, it is further assumed in this example that the first coverage area 210 is heavily loaded and congested whereas coverage area 220 has ample surplus capacity available.

When the system recognizes the elephant flow imbalance and the congestion of the first coverage area 210, the system sends control messages to the AN's RAN handover control elements, so that the control elements can preferentially hand over the elephant flow UE terminals from the congested first coverage area 210 into the second coverage area 220.

Figure 2B:
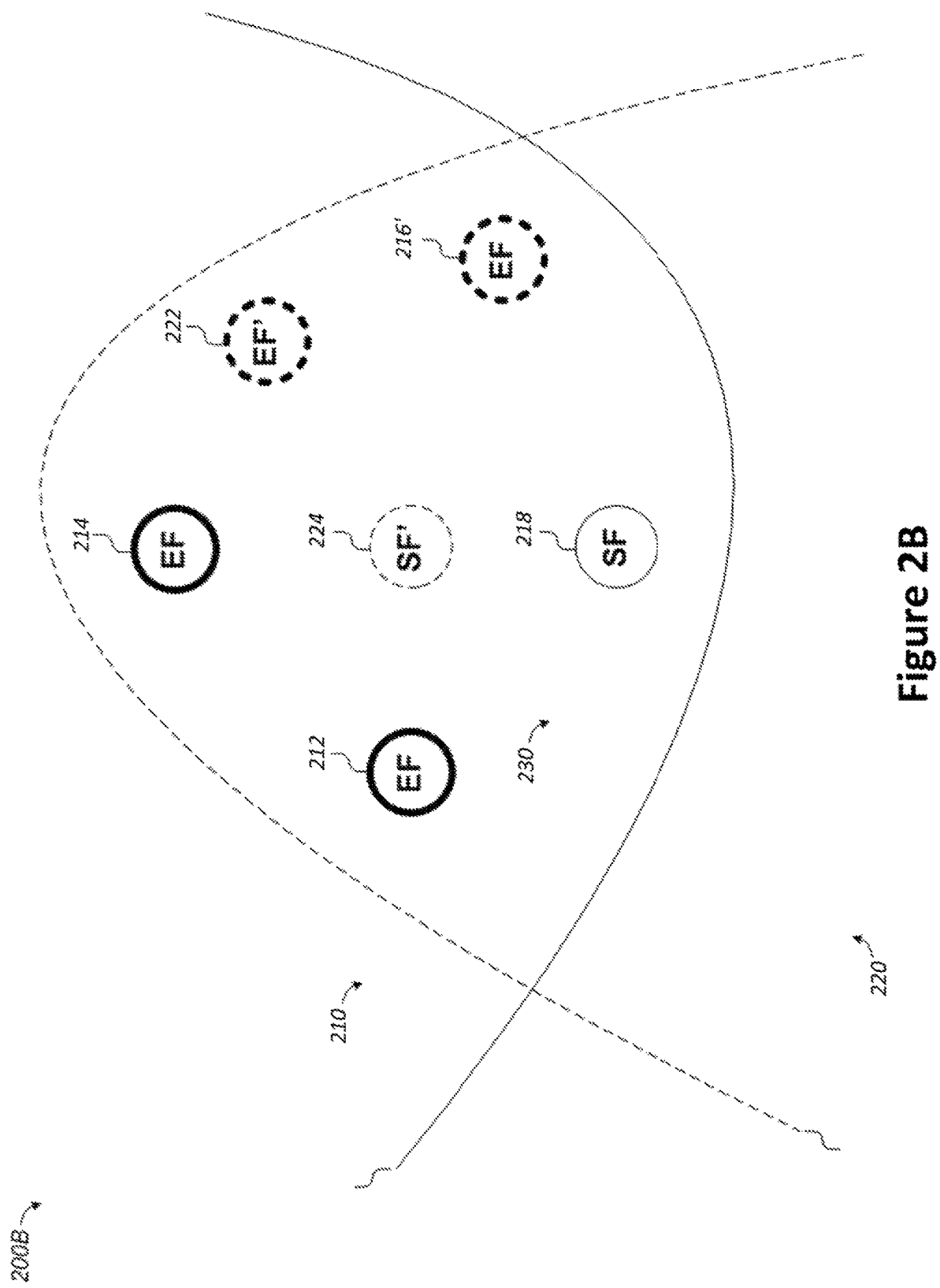
FIG. 2B illustrates a plurality of UE terminals in overlapping cell coverage areas after a UE terminal handover according to an embodiment.

FIG. 2B illustrates a plurality of UE terminals in overlapping cell coverage areas after a UE terminal handover according to an embodiment.

As illustrated in FIG. 2B, a selected one of the first elephant flow UE terminals 216', in the lower right part of the overlapping coverage area 230, has changed its network attachment from the base station providing coverage area 210 to the base station providing coverage area 220. The result in this case is a closer equilibrium between the total number of UE terminals operating elephant flows in the coverage areas 210 and 220.

In some embodiments, a base station may achieve preferential handover of certain UE terminals via manipulation of the radio signal strength or quality thresholds used for triggering handover in UE-mobile-assisted handover procedures. For instance, the base station may lower a handover threshold for UE terminals operating elephant flows compared with UE terminals operating standard flows. In other embodiments, the serving base station causes a UE terminal to be handed over by commanding the UE terminal to switch to a different, selected target base station.

FIG. 2C illustrates a plurality of UE terminals in overlapping cell coverage areas after a shift in coverage according to an embodiment.

In other embodiments, the coverage area footprints themselves may be manipulated so that selected elephant flow UE terminals are handed over between serving coverage areas. According to an embodiment, a base station uses conventional best signal strength/quality procedures to decrease the coverage area footprint associated with the base station.

For example, in the scenario illustrated in FIG. 2C, the first coverage area 210' has been altered so that a selected elephant flow UE terminal 216" in the lower right of the former first coverage area 210 has been shifted from the first coverage area 210 to the second coverage area 220. According to various embodiments, the first coverage area 210' has been shifted, by the associated base station, using electronic array antennas, electric antenna pointing, carrier aggregation, and heterogeneous networks methods.

In other embodiments, additional coverage areas or radio channel spectrum may be switched on and off depending on the need in scenarios where an existing coverage area becomes congested and has more than a threshold level of UE terminals operating elephant flows, for example to achieve a more efficient power usage by the AN.

FIG. 3A is a flow chart illustrating a method 300A of identifying an elephant flow according to an embodiment. In a specific embodiment, the method 300A is carried out by a flow manager or a system including a flow manager and a transport manager.

At S310A, flow types of one or more data flows traversing a network are detected. The flow types include, for example, elephant flows and standard flows. The one or more data flows are operated by UE terminals in one or more coverage areas.

An elephant flow among the one or more data flows are detected at S320A. The elephant flows are detected based on headers of packets comprising the one or more data flows, for example. For example, network and/or transport layer headers of the packets are inspected at S310A including, for example, combinations of IP source and destination addresses, TCP or UDP source and destination ports, protocols (in the case of IPv4), flow labels (in the case of IPv6), flags, extension header fields, etc.

In an embodiment, a data flow associated with a specific data type, e.g., video streaming data, is designated as an elephant flow. In certain embodiments, a data flow having a duration that is greater than a threshold duration is identified as an elephant flow. In some embodiments, a data flow having a throughput that is greater than a threshold throughput is identified as an elephant flow. Each of the various thresholds used to designate elephant flows may be predetermined.

At S330A, a transport manager is informed of the identified elephant flow. For example, a message is transmitted to the transport manager identifying the elephant flow.

In embodiments of the present disclosure, the transport manager is included in the end-to-end path of data flows through the network by default rules or cabling, and the transport manager is informed of detected flows that match one or more classification templates. Accordingly, the transport manager is able forward packets of standard traffic flows without further processing.

FIG. 3B is a flow chart illustrating a method 300B of identifying an elephant flow according to an embodiment. In a specific embodiment, the method 300B is carried out by a flow manager or a system including a flow manager and a transport manager.

At S310B, flow types of one or more data flows traversing a network are detected. The flow types include, for example, elephant flows and standard flows. The one or more data flows are operated by UE terminals in one or more coverage areas.

An elephant flow among the one or more data flows are detected at S320B. The elephant flows are detected based on headers of packets comprising the one or more data flows, for example. In an embodiment, a data flows associated with a specific data type, e.g., video streaming data, is designated as an elephant flow.

The elephant flow is detected based on headers of packets comprising the one or more data flows, for example. For example, network and/or transport layer headers of the packets are inspected at S310A including, for example, combinations of IP source and destination addresses, TCP or UDP source and destination ports, protocols (in the case of IPv4), flow labels (in the case of IPv6), flags, extension header fields, etc.

In an embodiment, a data flow associated with a specific data type, e.g., video streaming data, is identified as an elephant flow. In certain embodiments, a data flow having a duration that is greater than a threshold duration is identified as an elephant flow. In some embodiments, a data flow having a throughput that is greater than a threshold throughput is identified as an elephant flow.

At S330A, the identified elephant flow is forwarded to a transport manager. In an embodiment, data flows bypass the transport manager according to default rules, but elephant flows are selectively forwarded to the transport manager, such that the transport manager selectively receives elephant flows and does not receive standard flows.

In some embodiments, the elephant flow is selectively diverted through the transport manager. For example, once the elephant flow is identified, reconfiguration of the packet forwarding logic in the network is triggered, so that the packets within the elephant flow traversing that network are directed to the transport manager. For example, the transport manager becomes included within the end-to-end path between a server and a UE terminal operating the elephant flow.

According to certain embodiments, characteristics of the identified elephant flow are communicated to equipment of the network, e.g., one or more routers and switches, so that the network can dynamically configure forwarding or switching rules in order to cause subsequent packets in the identified elephant flow to pass through the transport manager using principles of software defined networking.

FIG. 4 is a flow chart illustrating a method 400 of requesting handover of a UE terminal operating an elephant flow according to an embodiment. In specific embodiments, the method 400 is performed by a transport manager or a system including a flow detector and a transport manager.

At S410, types of data flows and congestion of a coverage area are monitored. According to various embodiments, data flows traversing a network from the coverage area are defined as elephant flows or standard flows. For example, elephant flows are selectively forwarded from a flow detector. In another example, information identifying the elephant flows among the data flows is received.

In embodiments, information identifying the absolute numbers of UE terminals operating in each cell, the relative fraction of UE terminals operating elephant flows in each cell, and the relative fraction of UE terminals operating standard flows in each cell, the availability of surplus capacity in each cell, or a combination thereof, is generated and stored. In an embodiment, the information includes a total number of UE terminals operating elephant flows in each cell. In specific embodiments, the information is generated periodically.

According to certain embodiments, the congestion of the coverage area is monitored by calculating a surplus capacity of the coverage area. For example, the surplus capacity is periodically determined.

At S420, one or more UE terminals operating elephant flows in the coverage area are identified. The UE terminals are identified, for example, based on headers of packets within the elephant flows.

The elephant flows are determined to exceed threshold characteristics at S430. The threshold characteristics may be defined for the coverage area, and may identify a state at which the coverage area is determined to be overloaded with elephant flows. In a specific embodiment, a number of the elephant flows is determined to be greater than a threshold number of elephant flows for the coverage area.

At S440, the coverage area is determined to be congested. For example, the first coverage area is determined to have a surplus capacity that is lower than a threshold surplus capacity for the first coverage area.

When the one or more elephant flows are determined to exceed the threshold characteristics, and the coverage area is determined to be congested, a message is transmitted to network equipment requesting handover at S440. According to an embodiment, the message requests handover of a selected UE generating at least one of the elephant flows in the first coverage area.

In various embodiments, transmitting the message at S440 causes the network to preferentially execute handover of one or more UE terminals operating the elephant flows in the congested coverage area. For example, the network executes handover of the one or more UE terminals to a different, overlapping coverage area in the same network. In another example, the network executes handover of the one or more UE terminals to a different network, e.g., from an LTE network to a 3G network.

Accordingly, method 400 can be used to identify when a coverage area is overloaded with elephant flows, and cause a selected UE to be handed over to other coverage areas in order to reduce the number of elephant flows operating in the coverage area.

Figure 5A:
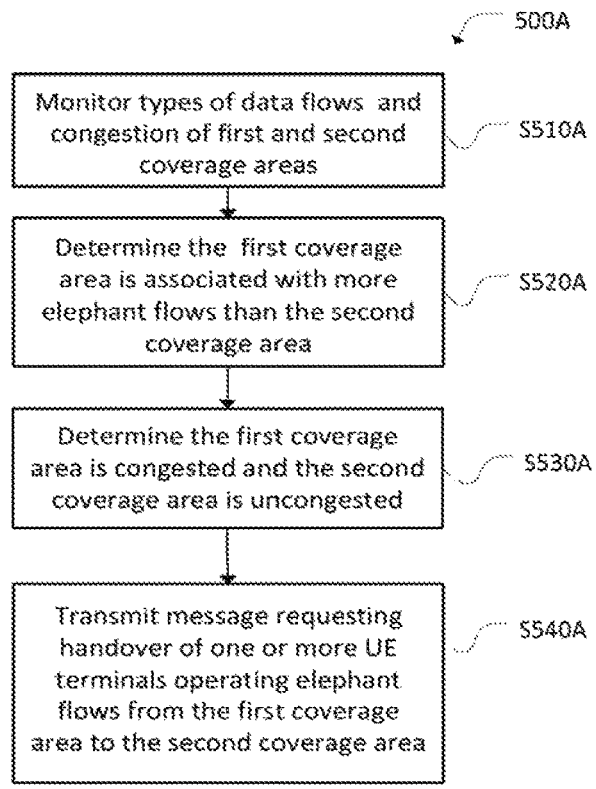
FIGS. 5A and 5B are flow charts illustrating methods of causing handover of a UE terminal from one coverage area to another coverage area according to embodiments.

FIG. 5A is a flow chart illustrating a method 500A of causing handover of a UE terminal from one coverage area to another coverage area according to an embodiment. In specific embodiments, the method 500A is performed by a transport manager or a system including a flow detector and a transport manager.

At S510A, types of data flows and congestion of first and second coverage areas are monitored. According to various embodiments, data flows traversing a network from the first and second coverage areas are defined as elephant flows or standard flows. For example, elephant flows are selectively forwarded from a flow detector. In another example, information identifying the elephant flows among the data flows is received.

In embodiments, information identifying the absolute numbers of UE terminals operating in each coverage area, the relative fraction of UE terminals operating elephant flows in each coverage area, and the relative fraction of UE terminals operating standard flows in each coverage area, the availability of surplus capacity in each coverage area, or a combination thereof, is generated and stored. In an embodiment, the information includes a total number of UE terminals operating elephant flows in each coverage area. In specific embodiments, the information is generated periodically.

At S520A, the first coverage area is determined to be associated with more elephant flows than the second coverage area. That is, an elephant flow imbalance is determined to exist between the first and second coverage areas. For example, the UE terminals in the first coverage area are determined to operate a greater number of elephant flows than the UE terminals in the second coverage area.

At S530A, the first coverage area is determined to be congested, and the second coverage area is determined to be uncongested. For example, a surplus capacity of the first coverage area is determined to be lower than a threshold associated with the first coverage area, and a surplus capacity of the second coverage area is determined to exceed a threshold associated with the second coverage area.

At S540A, a message is transmitted, which requests handover of one or more UE terminals operating elephant flows from the first coverage area to the second coverage area. For example, the message is a control message that is transmitted to network equipment. In a specific example, the message is transmitted to a base station operating the first coverage area.

Accordingly, method 500A can be used to identify when a coverage area is overloaded with elephant flows and congested compared to another coverage area, and cause a selected UE terminal to be handed over a non-overloaded and uncongested coverage areas in order to reduce the number of elephant flows operating in the overloaded and congested coverage area.

Figure 5B:
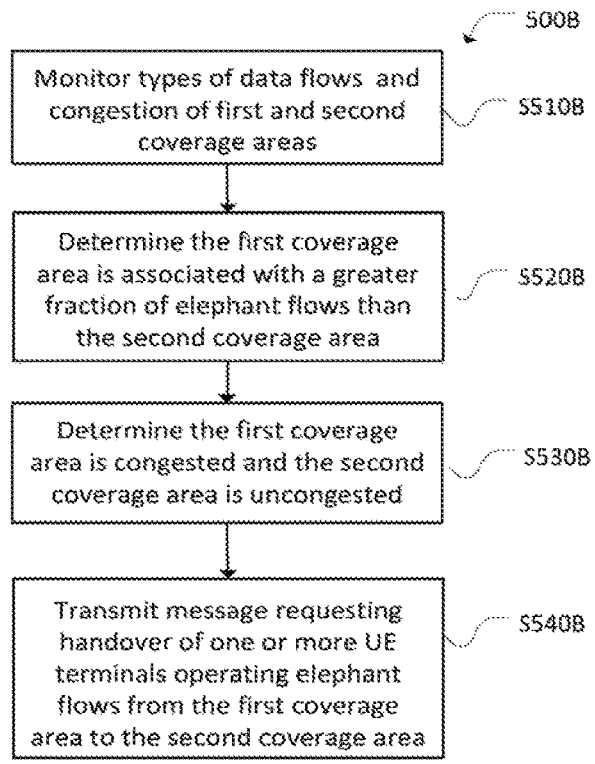

FIG. 5B is a flow chart illustrating a method 500B of causing handover of a UE terminal from one coverage area to another coverage area according to an embodiment. In specific embodiments, the method 500B is performed by a transport manager or a system including a flow detector and a transport manager.

At S510B, types of data flows and congestion of first and second coverage areas are monitored. According to various embodiments, data flows traversing a network from the first and second coverage areas are defined as elephant flows or standard flows. For example, elephant flows are selectively forwarded from a flow detector. In another example, information identifying the elephant flows among the data flows is received.

In embodiments, information identifying the absolute numbers of UE terminals operating in each coverage area, the relative fraction of UE terminals operating elephant flows in each coverage area, and the relative fraction of UE terminals operating standard flows in each coverage area, the availability of surplus capacity in each coverage area, or a combination thereof, is generated and stored. In an embodiment, the information includes a total number of UE terminals operating elephant flows in each coverage area. In specific embodiments, the information is generated periodically.

At S520B, the first coverage area is determined to be associated with a greater fraction of elephant flows than the second coverage area. That is, an elephant flow imbalance is determined to exist between the first and second coverage areas. For example, the relative fraction of UE terminals operating elephant flows in the first coverage area is determined to be greater than the relative fraction of UE terminals operating elephant flows in the second coverage area.

At S530B, the first coverage area is determined to be congested, and the second coverage area is determined to be uncongested. For example, a surplus capacity of the first coverage area is determined to be lower than a threshold associated with the first coverage area, and a surplus capacity of the second coverage area is determined to exceed a threshold associated with the second coverage area.

At S540B, a message is transmitted, which requests handover of one or more UE terminals operating elephant flows from the first coverage area to the second coverage area. For example, the message is a control message that is transmitted to network equipment. In a specific example, the message is transmitted to a base station operating the first coverage area.

Figures 6A, 6B:
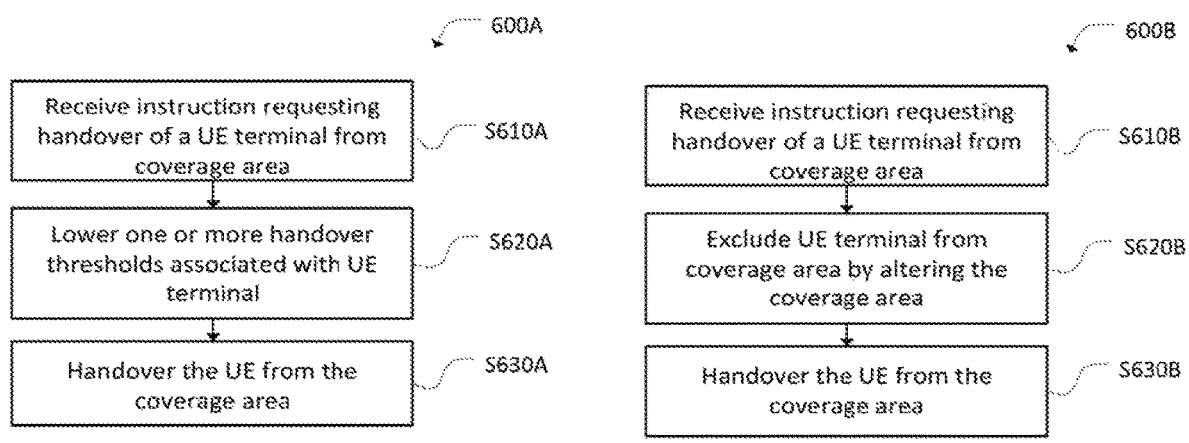
FIGS. 6A and 6B are flow charts illustrating methods of executing a handover of a UE terminal from a coverage area according to embodiments.

Accordingly, method 510B can be used to reduce an elephant flow imbalance between two overlapping coverage areas when the coverage area that is relatively overloaded with elephant flows is congested. FIG. 6A is a flow chart illustrating a method 600A of executing a handover of a UE terminal from a coverage area according to an embodiment. According to various embodiments, the method 600A is carried out by network equipment, e.g., a base station associated with the coverage area.

An instruction is received at S610A. The instruction requests handover of a UE terminal from the coverage area. According to various embodiments, the UE terminal among one or more UE terminals operating in the coverage area.

At S620A, one or more handover thresholds associated with the UE terminal are lowered based on the instruction. In some embodiments, preferential handover of the UE terminal may be achieved via manipulation of the radio signal strength or quality thresholds used for triggering handover of the UE terminal in UE-mobile-assisted handover procedures. For instance, a handover threshold for UE terminals operating elephant flows may be lowered compared with UE terminals operating standard flows. In other embodiments, the UE terminal is handed over by commanding the UE terminal to switch to a different, selected target base station.

At S630A, handover is executed of the UE terminal from the coverage area. For example, the UE terminal is handed over to another coverage area in the same network that has a lower number or percentage of elephant flows and a greater available surplus capacity. In an embodiment, the other coverage area specified in the instruction received at S610A. In another example, the UE terminal is handed over to another network.

Accordingly, method 600A can be executed to preferentially cause handover of elephant flows from an overloaded and congested coverage area.

FIG. 6B is a flow chart illustrating a method 600B of executing a handover of a UE terminal from a coverage area according to an embodiment. According to various embodiments, the method 600B is carried out by network equipment, e.g., a base station associated with the coverage area.

An instruction is received at S610B. The instruction requests handover of a UE terminal from the coverage area. According to various embodiments, the UE terminal among one or more UE terminals operating in the coverage area.

At S620B, the UE terminal is excluded from the coverage area by altering the coverage area. According to an embodiment, best signal strength/quality procedures are used to decrease a footprint of the coverage area. In various embodiments, the footprint of the coverage area is shifted using electronic array antennas, electric antenna pointing, carrier aggregation, and heterogeneous networks methods.

In some embodiments, additional coverage areas or radio channel spectrum may be switched on and off when the UE terminal is excluded from the coverage area.

At S630B, handover is executed of the UE terminal from the coverage area. For example, the UE terminal is handed over to another coverage area in the same network that has a lower number or percentage of elephant flows and a greater available surplus capacity.

In an embodiment, the other coverage area specified in the instruction received at S610B. In another example, the UE terminal is handed over to another network.

Accordingly, method 600B can be executed to preferentially cause handover of elephant flows from an overloaded and congested coverage area.

In various embodiments of the present disclosure, UE terminals generating elephant flows in congested networks can be efficiently reallocated to less-burdened networks.

The functions and methods discussed in this disclosure can be performed by specific hardware, and/or software executed on general computer hardware. According to various embodiments, the methods are performed by one or more processors executing program commands. The program commands may be stored in a memory, a non-transitory computer-readable medium, etc.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

What is claimed is:

1. A method, comprising:
    identifying one or more elephant flows operating in a first coverage area;
    comparing the identified one or more elephant flows to one or more threshold characteristics;
    identifying one or more user equipment (UE) terminals in the first coverage area which are each an endpoint of at least one of the one or more elephant flows;
    determining whether the coverage area is congested; and
    in response to the one or more elephant flows exceeding the one or more threshold characteristics and the coverage area being congested, causing handover of the one or more UE terminals from the first coverage area.

2. The method of claim 1, wherein identifying the identified one or more elephant flows operating in the first coverage area includes receiving the one or more elephant flows from a flow detector.

3. The method of claim 1, wherein comparing the identified one or more elephant flows to the one or more threshold characteristics includes determining whether a number of the one or more elephant flows exceeds a threshold number, and
wherein the one or more elephant flows exceeds the threshold characteristics when the number of the one or more elephant flows is greater than the threshold number.

4. The method of claim 1, wherein comparing the identified one or more elephant flows to the threshold characteristics includes determining whether an elephant flow imbalance exists between the first coverage area and a second coverage area, the first and second coverage areas being overlapped.

5. The method of claim 1, wherein determining whether the coverage area is congested includes determining whether a surplus capacity of the coverage area is under a threshold capacity, the surplus capacity being defined between a total capacity of the coverage area and an amount of the total capacity currently in use.

6. The method of claim 1, wherein causing handover of the one or more UE terminals from the first coverage area includes transmitting a message to network equipment, the message requesting handover of the one or more UE terminals.

7. The method of claim 6, wherein the message identifies a selected UE terminal among the one or more UE terminals, the selected UE terminal being located in an area where the first coverage area overlaps a second coverage area.

8. The method of claim 4, further comprising:
determining that there is an elephant flow imbalance between the first coverage area and the second coverage area when there are fewer elephant flows operating in the second coverage area than in the first coverage area.

9. The method of claim 6, wherein the network equipment is a base station serving the first coverage area.

10. The method of claim 1, wherein causing handover of the one or more UE terminals from the first coverage area includes causing handover of a selected one of the UE terminals from the first coverage area to a second coverage area, the second coverage area overlapping the first coverage area.

11. The method of claim 1, wherein causing handover of at least one of the one or more UE terminals from the first coverage area includes causing handover of a selected one of the one or more UE terminals from a first network technology to a second network technology.

12. A system, comprising:
a memory storing non-transitory program commands; and
a processor,
wherein, when the processor executes the program commands, the processor:
identifies one or more elephant flows operating in a first coverage area;
compares the identified one or more elephant flows to one or more threshold characteristics;
identifies one or more user equipment (UE) terminals in the first coverage area which are each an endpoint of at least one of the one or more elephant flows;
determines whether the first coverage area is congested; and
in response to the one or more elephant flows exceeding the one or more threshold characteristics and the coverage area being congested, causes handover of the one or more UE terminals from the first coverage area.

13. The system of claim 12, wherein the processor compares the identified one or more elephant flows to the one or more threshold characteristics by determining whether a number of the one or more elephant flows exceeds a threshold number, and
wherein the one or more elephant flows exceed the threshold characteristics when the number of the one or more elephant flows is greater than the threshold number.

14. The system of claim 12, wherein the processor compares the identified one or more elephant flows to the one or more threshold characteristics by determining whether an elephant flow imbalance exists between the first coverage area and a second coverage area, the first and second coverage areas being overlapped.

15. The system of claim 12, wherein the processor determines whether the coverage area is congested by determining whether a surplus capacity of the coverage area is under a threshold capacity, the surplus capacity being defined between a total capacity of the coverage area and an amount of the total capacity currently in use.

16. The system of claim 12, wherein the processor causes handover of the one or more UE terminals from the first coverage area by transmitting a message to network equipment, the message requesting handover of the one or more UE terminals,
wherein the message identifies a selected UE terminal among the one or more UE terminals, the selected UE terminal being located in an area where the first coverage area overlaps a second coverage area.

17. The system of claim 12, wherein the processor causes handover of the one or more UE terminals from the first coverage area by causing handover of a selected one of the one or more UE terminals from the first coverage area to a second coverage area, the second coverage area overlapping the first coverage area.

18. A transport manager, comprising:
a memory storing non-transitory program commands; and
one or more processors,
wherein, when the one or more processors execute the program commands, the one or more processors:
identify one or more first elephant flows operating in a first coverage area;
determine that a number of the one or more first elephant flows exceeds a number of one or more second elephant flows operating in a second coverage area, the second coverage area overlapping the first coverage area;
determine the first coverage area is congested;
determine the second coverage area is uncongested;
identify at least one user equipment (UE) terminal in the first coverage area which is an endpoint of at least one of the one or more first elephant flows; and
transmit a message to a base station serving the first coverage area, the message requesting handover of the at least one UE terminal from the first coverage area to the second coverage area.

* * * * *